C. D. PANTAZE.
COTTON SEED CULLING MACHINE.
APPLICATION FILED FEB. 3, 1917.
1,223,607.
Patented Apr. 24, 1917.
2 SHEETS—SHEET 1.
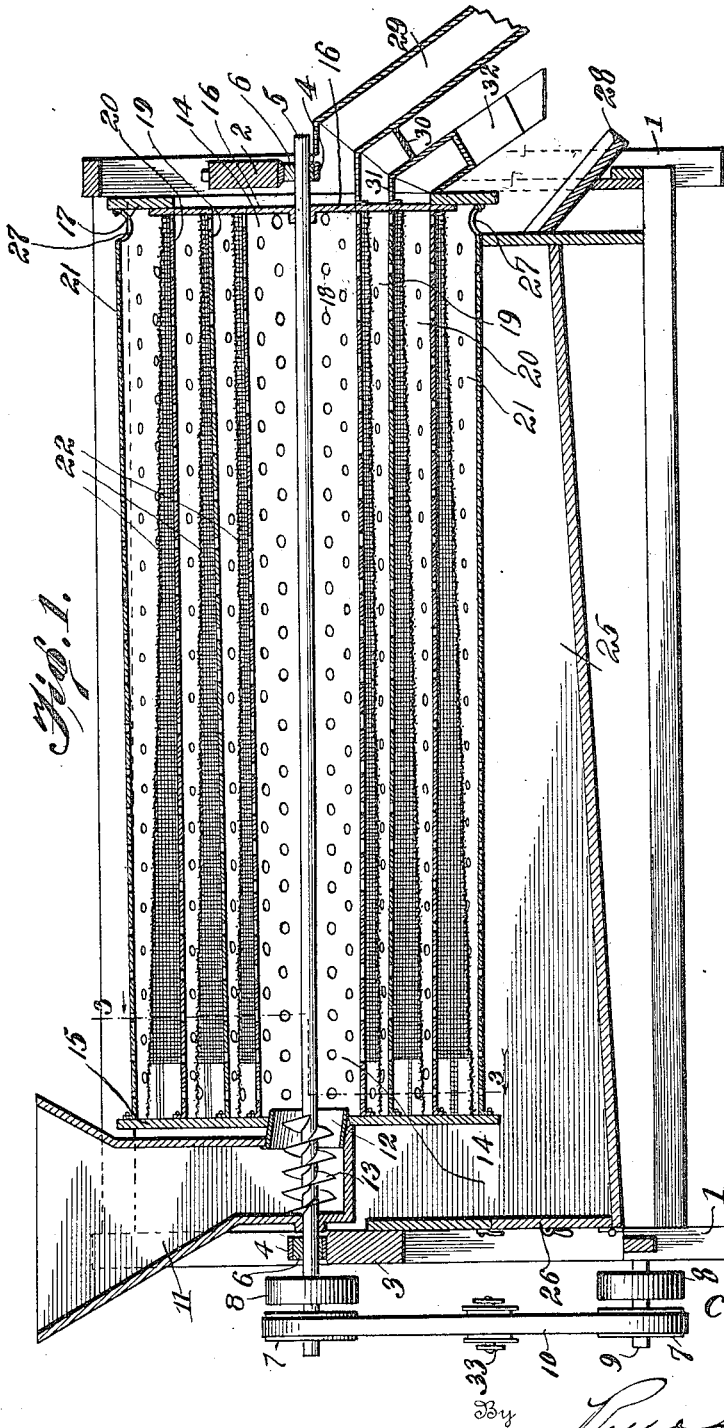
Inventor
Chas. D. PANTAZE.

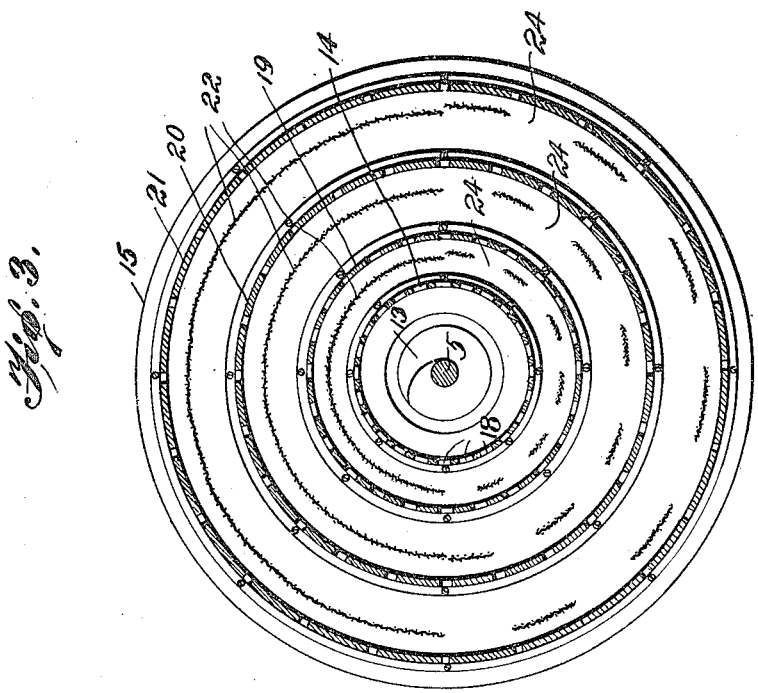

UNITED STATES PATENT OFFICE.

CHARLES D. PANTAZE, OF BIRMINGHAM, ALABAMA.

COTTON-SEED-CULLING MACHINE.

1,223,607. Specification of Letters Patent. Patented Apr. 24, 1917.

Application filed February 3, 1917. Serial No. 146,534.

*To all whom it may concern:*

Be it known that I, CHARLES D. PANTAZE, a citizen of the United States of America, residing at Birmingham, in the county of Jefferson and State of Alabama, have invented certain new and useful Improvements in Cotton-Seed-Culling Machines, of which the following is a specification.

My invention relates to a machine for culling, grading and separating cotton seed.

It is desirable to treat the cotton-seed as delivered from the linter gin in order to remove any foreign matter therefrom and to grade them in size. In apparatus heretofore used for this purpose, it has been found that the lint, adhering to the cotton-seed as delivered to the culling machine, interferes materially with its accurate and successful operation, because where the seed is passed through holes in the grading drum or drums, lint on a seed will prevent its falling through a hole through which it would otherwise fall and thus the culling process has been rendered less exact in its operation than I have found possible by the apparatus which forms the subject matter of my present invention.

My present invention is based upon the idea that, if the spaced perforated separating drums, frusto-conical in shape and symmetrically arranged, have interposed between them a delinting return means, such as reversely disposed frusto-conical wire mesh drums, the latter will catch all of the seed falling through each drum successively and carry it in a reverse direction to its movement in the drums, acting between each separating step to further and more completely delint the cotton-seed, and thereby making the machine grade more accurately to size as the seed approach the drums containing the openings of the smaller diameter and where it will be obvious the presence of the lint has the greatest effect in causing cull seed to escape with the smallest sized seed instead of falling into the cull bin.

My invention, in its preferred embodiment, is illustrated in the accompanying drawings which form a part of this specification, and in which:—

Figure 1 shows the culling machine in a central section taken longitudinally and vertically.

Fig. 2 is an end elevation of the discharge end of the machine.

Fig. 3 is a broken section through the separating drums taken on the line 3—3 of Fig. 1.

Similar reference numerals refer to similar parts throughout the drawings.

In the embodiment illustrated, the machine is mounted in a frame work comprising uprights 1 and end transverse members 2 and 3 forming the supports for the bearings 4 in which a shaft 5 rotates. This shaft is mounted at each end on eccentric collars 6 which turn in the bearings 4 and give the shaft an oscillatory or shaking motion as it rotates. Upon one end of the shaft I mount a driving pulley 7 and an idler pulley 8 and similar pulleys are mounted on a countershaft 9 at the base of the machine. A belt 10 is employed to drive the shaft 5 from the countershaft which is driven in any suitable manner. The shaft 5 at one end supports a hopper 11 which oscillates therewith and which at its lower end forms a chute with a lateral discharge spout 12 substantially concentric with the shaft. Chains 12$^a$ support the hopper in upright position while leaving it free to oscillate. The portion of the shaft 5 which traverses the hopper chute carries a spiral feed screw 13 adapted to force the seed therefrom and through the spout 12 into the left hand end of the inner culling drum 14. This drum is made fast at its left hand end to a circular head 15 having a central aperture to receive the spout 12, and it is connected to the hopper so as to oscillate therewith. The drum at its other end is made fast to a spider 16 mounted on the shaft 5 and connected at its outer end to an annular end plate 17 of substantially the same external diameter as the head 15. The inner drum 14 is formed of sheet metal having large perforations or holes 18 therein and frusto-conical in shape with its larger or discharge end to the right (Fig. 1). Surrounding this drum 14 and suitably spaced therefrom are a series of symmetrically arranged perforated sheet metal culling drums 19, 20 and 21, all preferably of the same length as 14 and all secured at one end to the plate 15 and at the other end to the spider 16 or to the plate 17. These drums all feed toward the same end of the machine as drum 14 and are arranged increasing distances apart as they depart from the shaft center.

Between each pair of culling drums I interpose a reversely flaring frusto-conical delinting screen drum 22. These screens at their smaller right hand ends being made fast to the out-turned flange 23 of the culling drum which they immediately surround at their other ends are made fast to the head 15. Adjacent to the head 15 the screens are provided with spaced discharge apertures 24, see lower half of Fig. 3, these apertures increasing in circumferential length with the increasing diameter of the screens. From the construction described it will be obvious that the culling drums tend to feed the seed to the right and that the delinting screen drums catch and return the seed falling through the culling drums the full length of the machine to the left, thus causing the seed to be passed back and forth the full length of the machine six times in the construction shown before reaching the outer drum 21, through which the culls or rejected seed too small to be used fall into the cull bin 25 which has a sloping bottom leading toward a hinged discharge door 26. The outer culling drum 21 has a series of large discharge holes or openings 27 at its discharge end through which the smallest seed, which reach the last drum and are yet too large to pass therethrough into the cull bin, are discharged and fall into a chute 28 from which they are delivered to any suitable receptacle. In collecting the grades of seed from the culling drums 14, 19 and 20, it is necessary to provide for each a separate chute which at its intake end has a running fit with the discharge end of its respective feed drum. In the case of the drum 14, I provide a chute 29, the underside of which projects in under the cross bearing bar 2 and has a running engagement with the annular flanged end of the drum 14. In having such engagement it will be apparent that it is necessary to set the spider arms 16 in notches in the drum ends which will bring their outer faces flush with the end flange of the drum and thus not interfere with the continuous running contact between the chute and drum. Rocks, trash and other larger foreign matter pass along the drum 14 and into the chute 29 by means of which they are discharged at the end of the machine beyond the chute 28. The discharge chute 30 for the drum 19 has its drum engaging wall 31 bearing against the flange of the drum 19 and is deflected thence to the right, see Fig. 2, so as to deliver the large seed into a receptacle at the right of the machine. The chute 32 for the drum 20 is disposed to catch the seed in the manner described and deliver it to the left (Fig. 2), its top wall being formed by the bottom wall 31 of chute 30 and its under portion forming a running engagement with the plate 17 of drum 20. In order to avoid interference with the chutes, the bearing 2 at the right of the machine, Fig. 1, is disposed above the bearing. A tension roller 33 is caused to press against and maintain the tension on the belt 10 during the oscillatory movement of shaft 5.

In operation, as the separation takes place in the respective culling drums, the delinting of the seed is also taking place by the action of the screen or wire cloth return drums 22, each acting to more completely delint the seed as they approach the cylinders of finer perforations, so that in the final separation, the seed can be graded true to size and unaffected by the presence of lint. The lint itself works readily through the drums and cylinders and falls into the cull bin 25, but the wire cloth is too fine to permit any seed to work therethrough.

Having thus described my invention, what I claim as new and desire to secure by Letters Patent, is:—

1. A cotton-seed culling machine comprising a plurality of concentrically arranged perforated sheet metal drums which increase in diameter toward their discharge ends, and return wire mesh screen drums adapted to delint the cotton-seed and disposed one between each pair of perforated drums and co-extensive in length therewith but increasing in diameter in the opposite direction therefrom, there being discharge openings at the larger ends of the screen drums, means to rotate the drums, and separate chutes to carry off the different grades of seed from the perforated drums.

2. A cotton-seed culling machine comprising a plurality of concentric perforated metallic drums which increase in diameter toward their discharge ends, means to rotate the drums, and delinting wire mesh return screens adapted to catch the seed passing through each drum, except the last, and to return same to the smaller end of the next larger drum, substantially as described.

3. A cotton-seed culling machine comprising a plurality of concentric perforated sheet metal drums which increase in diameter toward their discharge ends, means to rotate and oscillate the drums, and delinting wire mesh return screens rotatable with the drums and adapted to catch the seed passing through each drum, except the last, and to return same to the smaller end of the next larger drum, substantially as described.

4. A cotton-seed culling machine comprising a main driving shaft, means to rotate and oscillate the shaft, a feed hopper mounted on the shaft, and a culling apparatus also mounted on the shaft and comprising alternate and reversely flaring sheet metal and wire mesh screen drums, the metal drums having perforations and the screen drums being of a character to delint the cotton-seed.

5. In a cotton-seed culling machine, a plurality of concentric cylinders formed of perforated sheet metal and disposed concentrically with increasing diameters toward their discharge ends, a circular head plate to which the drums are connected at one end, a ring plate connected to an outer drum at the other end, a spider connecting said plate and the intermediate drums, a rotatable shaft on which said spider and circular head plate are mounted, screen return drums surrounding each inner perforated drum and extending from end to end thereof, said delinting screen drums having their diameter increasing toward the intake end of the perforated drums and having discharge openings at its larger end, and separate chutes to receive the seed discharged from each perforated drum.

6. A cotton-seed culling machine comprising perforated sheet metal drums arranged concentrically and increasing in diameter toward their discharge ends, each drum having an out-turned end flange, retaining means to which the flanges are made fast at each end, wire screen return drums, one of which is made fast at one end of the out-turned flange of the drum it immediately surrounds and which returns with increasing diameter to the intake end of such drum, where it is provided with discharge orifices, and separate chutes to receive and discharge seed from the several perforated drums.

7. In a cotton-seed culling machine, a plurality of rotatable perforated cylinders concentrically arranged and each having the under portion of its discharge end left exposed, and separate chutes having their receiving ends superposed and each making a running fit with the discharge end of its respective feed drum.

8. In a cotton-seed culling machine, a plurality of frusto-conical drums all of equal length, end supporting means to maintain the drums in concentric relation, the drums alternately increasing in diameter in opposite directions, one set of drums being of perforated sheet metal having perforations decreasing in size from the inner to the outer drums, and the other set of interposed drums being of delinting screening material, the apertures in which are too fine to permit the passage of the seed and which have their discharge openings at the ends thereof adjacent to the smaller ends of the perforated drums, and separate chutes connecting with the discharge ends of the perforated drums and adapted to separately carry off the seed therefrom.

In testimony whereof I affix my signature.

CHARLES D. PANTAZE.

Witness:
NOMIE WELSH.

Copies of this patent may be obtained for five cents each, by addressing the "Commissioner of Patents, Washington, D. C."